(12) United States Patent
Otto et al.

(10) Patent No.: US 7,547,406 B2
(45) Date of Patent: Jun. 16, 2009

(54) METHOD FOR THE DIRECT AND CONTINUOUS PRODUCTION OF HOLLOW ARTICLES FROM A POLYMER MELT

(75) Inventors: Brigitta Otto, Milow (DE); Roland Schäfer, Alzenau (DE); Holger Bachmann, Weiterstadt (DE); Ludwig Hölting, Bruchköbel (DE); Stefan Deiss, Harxheim (DE)

(73) Assignee: Lurgi Zimmer GmbH, Frankfurt am Main (DE)

( * ) Notice: Subject to any disclaimer, the term of this patent is extended or adjusted under 35 U.S.C. 154(b) by 806 days.

(21) Appl. No.: 10/966,352

(22) Filed: Oct. 14, 2004

(65) Prior Publication Data

US 2005/0161863 A1    Jul. 28, 2005

(30) Foreign Application Priority Data

Nov. 28, 2003    (DE)   .................... 103 56 298

(51) Int. Cl.
*B29C 45/00*    (2006.01)
*B29C 49/00*    (2006.01)

(52) U.S. Cl. ................. 264/328.17; 264/328.1; 264/328.9; 264/297.1; 264/523; 425/557; 425/588

(58) Field of Classification Search ............ None
See application file for complete search history.

(56) References Cited

U.S. PATENT DOCUMENTS

| | | | |
|---|---|---|---|
| 5,656,719 A | 8/1997 | Stibal | 528/491 |
| 5,928,596 A | 7/1999 | McLeod | 264/297.1 |
| 5,945,460 A | 8/1999 | Ekart | 521/48 |
| 5,968,429 A | 10/1999 | Treece | 264/102 |
| 6,559,271 B2 | 5/2003 | Schaaf | 528/272 |

*Primary Examiner*—Steven P. Griffin
*Assistant Examiner*—Jason L. Lazorcik
(74) *Attorney, Agent, or Firm*—Andrew Wilford

(57) ABSTRACT

A method of making shaped articles from highly condensed polyester melt and especially preforms for the blow molding of food and especially beverage containers. A melt is continuously withdrawn from the polycondensation reactor and is fed to the shape-imparting units, especially a multiplicity of injection-molding machines without solidification between the final reactor and the injection molders and without degassing between the final reactor and the injection molding machines.

24 Claims, 1 Drawing Sheet

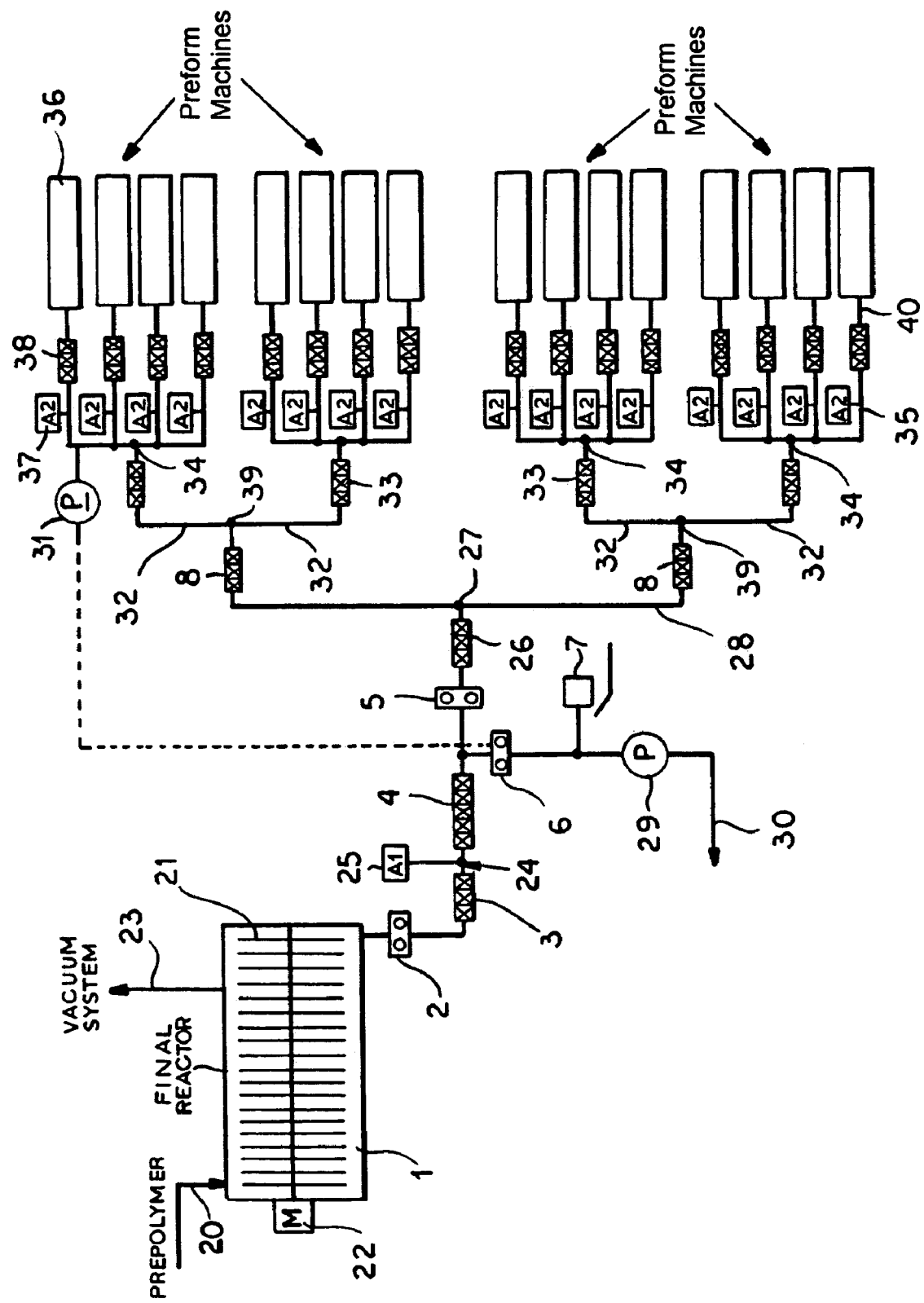

METHOD FOR THE DIRECT AND CONTINUOUS PRODUCTION OF HOLLOW ARTICLES FROM A POLYMER MELT

FIELD OF THE INVENTION

My present invention relates to a method of making molded articles from high-condensation polyester and, more particularly, to a method of making shaped bodies directly and continuously from highly condensed polyester melt.

BACKGROUND OF THE INVENTION

In the following description the molded article to which reference is made will be understood to include shaped bodies generally, and, in particular, hollow bodies such as tubular or pipe-shaped articles. However, the invention is also applicable to the production of other shaped articles such as foils, film, sheets and the like.

In the fabrication of conventional molded or shaped articles, generally aromatic polyesters or copolyesters, especially polyethylene terephthalate and its copolymers are used with small amounts or proportions of, for example, isophthalic acid or cyclohexanedimethanol, polybutyleneterephthalate, polytrimethyleneterephthalate, polyethylenenaphthalate and their copolyesters as starting materials. The starting material after a melt polycondensation with a certain intrinsic viscosity (IV) can be injection molded in an injection molding machine to produce hollow articles. The intrinsic velocity for example in the case of polyethyleneterephthalate and its copolyesters with a low degree of modification, can range between 0.65 and 0.90 dl/g.

That method has been a standard method for producing PET food containers, especially bottles.

In this manufacturing process terephthalic acid or its esters are esterified with ethyleneglycol in an esterification stage comprised of one or more reactors in cascade.

These esters are subjected to polycondensation by an increase in temperature and reduction of pressure in the melt to a PET with an average viscosity and an IV of 0.55 to 0.65 dl/g. The product is cooled and granulated. The polycondensation usually is carried out in at least two stages in a so-called precondensation reactor and a final reactor following the precondensation reactor, the two reactors being referred to generally as condensation reactors. A greater number of condensation reactors may be connected in cascade depending upon the capacity of the apparatus which is desired and the conditions.

The melt obtained from the final reactor is granulated and the PET granulate can be fed to a reactor for solid state polycondensation (SSP) under inert gas at temperatures of 180° to 230° C. to a mean viscosity of 0.75 to 0.85 dl/g. This granulate is as a rule the final product and can be sold as such. Fabricators purchase this granulate and can use the same to produce hollow articles by molding processes and in molding machines. For example, different types of molding units may utilize such granules, including injection molding and blow-molding machines.

Usually preform machines operating in accordance with injection molding principles can produce parisons or blanks, also known as preforms which can then be converted in blow-molding machines, generally by other processors and at other locations, into polyester bottles or like containers. Machines are also provided for the fabrication of films and foil from the polyester granulate.

The solid state polycondensation (SSP) is used mainly for two reasons. Firstly to obtain a sufficient mechanical stability of the finished bottle, the viscosity of the polyester must exceed levels in polyesters used for textile applications. Secondly, the acetaldehyde content in the polymer melt leaving the final reaction must be reduced from about 30 to 70 ppm, to below 2 ppm following the conclusion of the solid phase polycondensation so that the acetaldehyde will not affect the taste of products packaged in the finished PET bottle. The acetaldehyde (AA) results as an unavoidable byproduct in PET production. Above all it is essential for taste reasons to keep the AA content of the PET of the finished bottle as low as is possible. The proportion of the AA in the PET of the bottle can be controllable to a certain degree by the technological conditions of polycondensation and the subsequent solid phase polycondensation. Depending upon the pretreatment of the polymer melt or its thermal history, the conditions in the solid phase polycondensation and the operation of the preform machine, acetaldehyde is formed during the phase of melting of the granulate. During the bottle formation in the blow-molding machine, the acetaldehyde concentration changes only marginally.

In the finished bottle when the latter is filled with soft drinks, the AA value should not exceed 8 ppm and in the case of filling with water, should not exceed 4 ppm.

The SSP requires comparatively expensive apparatus. Before the SSP is carried out the amorphous chips must be crystallized in a comparatively expensive crystal stage to avoid adhesion in the following solid phase polycondensation. In both stages significant amounts of inert gas are required which must be additionally cleaned after use so that it can be recycled in the process.

In general it has been found to be advantageous to produce the preforms on machines specifically selected for this purpose and to which the finished polyester melt can be fed directly. It has not been found to be advantageous to use the costly and time-consuming steps employed in fiber production but rather to ensure that the melt from the polycondensation stage will directly pass to the SSP.

DE 195 03 053 describes a method in which the melt from the polycondensation reactor is treated with inert gas and an AA-reducing low volatility amide compound over the stretch provided with static mixing elements and is subjected to vacuum degassing in the shortest possible time and with the lowest possible shear, can be fed to a molding device for the production of preforms.

In DE 195 05 680 inert gas is fed to the polycondensation melt with an IV=0.5-0.75 dl/g in a postcondensation reactor under vacuum until the product is polycondensed to a viscosity of 0.75-0.95 dl/g and the melt is then directly and immediately fed to an injection molding tool.

EP 0 842 210 describes another possibility for avoiding SSP. There the melt polycondensation is carried out to a viscosity of 0.65-0.85 dl/g, the polyester is cooled and is granulated, remelted and after a formation of greater surface area, is subjected to flushing with a suitable flushing agent from volatile substances like acetaldehyde.

In EP 0 842 211, a method has been proposed in which the polycondensation melt is fed to a degassing extruder with a polymer compression seen, simultaneously with a suitable flushing agent and the thus treated melt is directly fed to a shaping unit.

EP 0 836 548 describes how a polycondensation melt is fed in apparatus terms through a mixing stretch and a distributor into an injection molding unit without providing details of the process.

U.S. Pat. No. 6,099,778 discloses a method in which a polycondensation melt is directly fed to a shaping unit. The method is linked to conditions requiring the catalyst for polycondensation to be free from cobalt, an acetaldehyde reducing compound to be added and the melt to be degassed before it is fed to the shaping device at a pressure from above 25 mm Hg to standard pressure, whereby the degasification unit is comprised, for example, of a degasification extruder or some other appropriate conventional apparatus as the acetaldehyde reducing compounds, polyamide, polyesteramide and polyethyleneisophthalate are mainly mentioned.

WO 98/41381 describes an apparatus and a continuous process for producing shaped polyester articles with low acetaldehyde content from a polycondensation melt without intervening solidification of the polyester. The polycondensation melt is mixed in an extruder under pressure with an inert gas, the melt is degassed under vacuum and reacted in a mixing in the zone with an acetaldehyde reducing compound and then is fed to the injection molding unit. The acetaldehyde reducing agent can in principle be those mentioned in the previous paragraph.

EP 0 968 243 describes a similar process. The polycondensation melt is there fed into a mixing unit which can be comprised of a static mixer, a gear pump or an extruder. A stripping agent like nitrogen or carbon dioxide and an AA reducer like a polyamide or polyesteramide are added. The melt is fed from this mixing unit through one or more nozzles into a rapid evaporator. There it is degassed under a vacuum of 5 to 50 mm Hg and fed to a shaping unit. An AA reducer can be supplied to the latter as well.

In another proposal Feb. 25/26, 2003, inventa-Fischer has suggested a process for making preforms directly from polycondensation melt. For that purpose a high viscosity reactor would be built into the line to supply PET prepolymer and the viscosity would be raised to 0.85 dl/g. Then an AA reducing agent optionally other additives would be fed to the melt and the mixture fed by a mixer into the injection molding machine.

In DE 100 45 719, a method has been described which branches a part of the polycondensation melt from the final reactor and supplies an AA reducer like an amides of a polycarboxylic acid and multivalent amines as well as polyester stabilizers like for example triethylenephosphate to a branched stream. In the same extruder gaseous reaction products are removed by degasification fittings. The partial stream is then rejoined with the main stream. This method has the advantage that the expensive degasification extruder need only be outfitted for a partial stream of the polycondensation melt and therefore can be less expensive. The system nevertheless requires degasification.

As further possible AA reducing agents which can possibly avoid use of SSP, are the compounds proposed in U.S. Pat. No. 6,274,212, namely compounds which have two hydrogen atoms substituted as carbons connected with heteroatoms and which form organic compounds with acetaldehyde with reaction in the polyester and include at least two heteroatoms in an unbridged 5 or 6 member ring. A possible compound of this type is anthroanilamide. This additive can be sprayed as a suspension, for example, on a polyester granulate, for example, a master batch granulate or can be admixed with a melt formed by melting the granulate.

The described methods have the drawback that they require the use of expensive carrier gases for the melt degasification, additional apparatus for degasification and large and expensive equipment and depending upon the point at which the acetaldehyde is removed, the use of scavengers to prevent or reduce new formations of acetaldehyde.

OBJECTS OF THE INVENTION

It is, therefore, the principal object of the present invention to provide a method for the continuous direct production of hollow bodies from aromatic polyesters and their copolymers, which can utilize simpler apparatus, has lower costs and preferably minimal cost for additional or additive chemicals, which can nevertheless provide quality improvements with respect to the polyesters used for the production of hollow articles and especially containers for foodstuffs and bottles for beverages, and in general which will give better viscosity and color characteristics, reduced acetaldehyde presence and release and the like.

Another object of this invention is to provide a method for producing such hollow bodies and particularly containers for foods and beverages which is free from prior art disadvantages and can yield improve products at lower cost.

SUMMARY OF THE INVENTION

These objects are achieved, in accordance with the invention by a method which comprises:

(a) producing a melt of a high-condensation polyester in a polycondensation reactor system whereby the high-condensation polyester melt is outputted by a final reactor stage;

(b) passing the high-condensation polyester melt without any solidification and without degasification from the final reactor stage to a molding unit; and (c) shaping the molded articles from the high-condensation polyester melt in the molding unit.

Surprisingly, the effectiveness of the method of the invention, whereby articles are fabricated from a highly condensed polyester melt and in which the melt, between the polycondensation reactor or reactors and the shaping apparatus or unit is never solidified and between the final reactor and the molding unit there is no degasification unit, is totally unexpected in view of the teachings of the art which have invariably provided granulation steps and/or degasification steps between the final condensation stage and the preform machines.

The method of the invention has the advantage that neither an additional SSP step with an associated granulating device, crystallization unit and gas preparation unit with high gas cost nor an expensive and complicated to make and maintain degasification extruder is required. There is no similar process known in the art.

The method of the invention is characterized by the production of shaped articles from a high viscosity melt comprised of aromatic polyesters or copolyesters obtained from one or more dicarboxylic acids or their methylesters like terephthalic acid, isophthalic acid, naphthalenedicarboxylic acid and/or 4,4-bisphenyldicarboxylic acid and one or more diols like ethyleneglycol, propyleneglycol, 1,4-cyclohexandimethanol, neopentylglycol and/or diethyleneglycol.

These starting compounds can be processed in a known manner in accordance with the continuous methods of esterification or reesterification, utilizing known catalysts, followed by melt polycondensation in modified polycondensation reactors under vacuum to high viscosity polyester melts to the preferably polyethyleneterephthalate homopolymers or copolymers with a comonomer content of less than 10 mass % are used.

The polymer melts are fed directly from the final reactor through a defined piping system for their distribution, directly into the shaping units, e.g. injection molding machines. Preferably the melt upon exiting from the final reactor has an intrinsic viscosity (I.V.) between 0.74 and 0.85 dl/g. Since the production output of the final reactor cannot be matched instantaneously to the requirements of one or more injection molding units in the case of brief interruptions or variations in the number of such units which are in operation because of maintenance or defects, in accordance with a preferred embodiment of the invention, up to 50%, preferably up to 20%, and especially preferably a maximum of 10% of the melt stream is recycled through an esterification stage. The recycling of this part of the melt is usually effected downstream of the product pumps which feed the melt from the final reactor. On the path to the esterification stage, a high viscosity melt can be glycolyzed by the addition of up to a maximum of 10% ethyleneglycol and the thus diluted lower viscosity melt more easily fed back to the esterification stage.

Selectively, a part of the main melt stream can be fed in accordance with another feature of the invention to a granulating device or unit. The thus produced polyester granulate can be sold or can for example be used for the production of preforms in a preform machine of the manufacturer itself or for distribution to another fabricator of preforms. Before processing of the granulate thus made to preforms for the production of bottles, only a modified drying is required to prevent or limit adhesion of the only slightly crystallized chips.

By gating a certain part of the melt from the main stream which passes directly to the shaping units, it is possible to adjust the feed pressure for the shaping units independently of the actual production output of the final reactor. Above all this gating of a partial stream out of the main stream allows the melt requirements of the shaping machines to be compensated.

The control of the pressure in the melt line is effected immediately upstream of the shaping unit and a pressure can there be maintained between 1 and 20 bar and preferably at 10±1 bar by control of the gating of a portion of the melt out of the main melt flow.

Within the sense of the present invention the main melt flow will be understood as that portion of the melt from flows directly between the final reactor and the shaping units. That portion of the melt flow which is gated out for granulation and/or for recycling to the esterification stage are not considered to be part of the main melt flow reaching the shaping reactors.

The final reactor can for example be a polycondensation reactor for the production of high intrinsic viscosity aromatic polyester or copolyester as is described, for example, in EP 0 320 586. The end reactor can be thus a so-called double-drive reactor as produced by Zimmer AG and covered in U.S. Pat. No. 3,617,225. This reactor has, instead of a through-going shaft, a divided shaft upon which the mixing elements are affixed. The two half shafts are displaced by respective drives. A reactor of this type allows matching of the rotary speeds to the reaction conditions and especially the viscosity of the polymer melt.

To increase the flexibility of the plant, the intermediate product from the precondensation reactor can be fed to at least two final reactors operating in parallel and which supply different shaping units or injection molding machines. This has an advantage when products are to be produced which differ significantly in their final viscosities. Both final reactors can then be operated with different process conditions. The economic advantage is that each apparatus can operate at the capacity required with one, if desired, operating at a greater capacity than the other. In the embodiments described below, reference will be made to processing downstream of an end reactor regardless of whether that is one of one or more end reactors or is supplied by a single precondition reactor.

Preferably the melt from the final reactor is fed to at least two shape-imparting units (injection molding machines). Ahead of the first subdivision of the melt flow, a further pressure increasing unit is provided operating as a function of the pressure loss of the overall melt transfer system, in addition to the discharge pump of the final reactor, in order to ensure a continuous flow of the melt to the injection molding units.

The path of the melt between the first pressure-increasing device, e.g. pump, and the shape-imparting unit, e.g. injection molding machine, is so configured that the shape of the piping system and the distances to the shape-imparting unit are all identical such that the entire melt has the same thermal treatment as much as possible. This can be achieved by providing the melt pipings so that they are symmetrical and that the distribution of the melt is effected in a symmetrical manner. Preferably within each piping system and upstream of each subdivision or distribution of the melt, the temperature gradient between the exterior and interior, is equalized for each path by static mixing elements. The mixing elements in an ideal case should be located as close as possible to each of the branching locations of the melt path. The lengths of these static mixers should amount to a maximum of one to six times the interior diameter of the piping and preferably a maximum of one to three times the internal diameter.

To optimize the symmetry of the melt piping, the main melt flow from a final reactor is advantageously fed to an even number of shape-imparting units. Especially preferred is an arrangement of shape-imparting units in which they are provided in sets of four. This means that the last distribution of the main melt stream feeds four ducts which each directly can terminate in a respective shape-imparting unit or injection molding machine. For symmetry reasons the previous melt distribution can be made to two ducts each of which can be connected to a respective set of four shape-imparting units and each of those ducts may if necessary communicate with another four such ducts, etc. For each final reactor, therefore, 4, 8, 16, etc. shape-imparting units can be provided. The number of distributions of the melt can depend upon the total delivery rate of the apparatus and the quantity requirements of each shape-imparting unit. The number of distributions can be between one and four.

In order to keep the acetaldehyde content of the preform low, the main stream of the melt before it enters the shape-imparting unit can have an acetaldehyde reducing agent or a mixture of acetaldehyde reducing agents injected into it once or a maximum of twice. These agents or mixtures, which will be referred to below as an additive or as additives, in general terms, can be mixed into the polymer melt homogeneously utilizing static and optionally cooled mixing units which may be alternatingly installed in the pipe system and can promote the reaction between final and therefore terminal groups of the polyester and/or with any acetaldehyde which may be present. The additive can be supplied to the melt as a solid, as a mixture of solids, as an additive slurry or as a suspension in a dispersing agent.

The additive can be a single compound or a mixture of compounds which can individually or in combination reduce the acetaldehyde content of the polymer melt. Such compounds are known in the art.

The additives can also include compounds which interrupt or interfere with any polyester chain-breaking action and thereby reduce the formation of acetaldehyde. Compounds of this type are also known in the art. Preferably phosphorous-containing compounds are used. It is possible to use for example carboxyphosphoric acid compounds as have been described in DE 195 31 068. Further suitable phosphorous-containing stabilizers are those known from DE 103 37 522. It has been found that the simultaneous addition of substances of both classes has the effect of providing an especially low acetaldehyde content in the preform.

If the additive is injected in the form of a slurry, a dispersing agent must be provided which is compatible with the polyester. Advantageously, the dispersing agent is a compound which participates in the polycondensation reaction, for example ethyleneglycol in the case of a polyethyleneterephthalte process. The additive slurry can include other desirable compounds, like, for example, coloring agents (dyestuffs), UV absorbers, oxygen scavengers and carbon dioxide scavengers. The additives can be any which have been described in the art as suitable for a polyester melt. These include those introduced with the devices described in DE 198 41 376, DE 198 51 948 and DE 100 49 617. Other devices for injecting and mixing additives with the melt can be used as well. What is important with respect to the invention is that in every case there should be a short residence time of the melt between the final reactor and the shape-imparting unit so that the distribution of the additive in the melt should be as uniform as possible and dead spaces should be avoided. It is advantageous to provide the first additive injector and mixture in the melt line following the product discharge pump of the final reactor and upstream of the first melt distribution location.

With the use of the additives as thus described, the acetaldehyde content can be reduced to a maximum of 25 ppm and preferably below 8 ppm and especially preferably below a level of 4 ppm in a preform. With further injection of additives directly upstream of the shape-imparting machine, these concentrations can be lowered still further. A preferred embodiment of the invention thus contains an additional additive injector following the last melt distribution and upstream of the respective shape-imparting unit. In that case the melt flow line can have two or more additive injectors disposed in cascade. The amount of the additive supplied can be controlled in accordance with requirements, for example, based upon the acetaldehyde produced during the melt transport or the volume of the melt which is delivered. The amount of the additive supplied can be controlled based upon color or in order to control and regulate color, UV stabilizer content, the amount required for particular barrier characteristics or for maintaining a certain thermal stability or the like. As noted, the incorporation of the additive into the melt and its uniform distribution can be ensured by static mixing elements and their distribution over the length of the melt paths. This system has been found to be particularly effective in the production of preforms for bottles.

In another advantageous embodiment of the invention, the first additive injection unit supplies an additive to the melt which includes both a stabilizer and an acetaldehyde-reducing substance. By the addition of a stabilizer, with the use of nitrogen-containing acetaldehyde reducing substances, it is possible to prevent or limit discoloration of the polyester. Especially preferred are stabilizers of the carboxyphosphoric acid type.

In order to effectively control the acetaldehyde content in the shaped bottles, e.g. the preforms, the residence time of the melt between the last additive location and entry into the injection-molding machine or other shaping units must be as short as possible. Advantageously this stretch needs be so configured that the mean residence time of the mold in it is shorter than six minutes and preferably shorter than two minutes.

The quantity of the additive injected is dependent upon the basic load of the acetaldehyde during polycondensation, the residence time and temperature in the melt lines and the desired final concentration in the shaped body. The longer the residence time of the melt in the melt line, the higher will be the additive quantity which is required. The mean residence time of the melt between the final reactor and entry into the shape-imparting unit need not be high although in the case of an increasing capacity of the final reactor, it will necessarily be greater since the melt must then be divided to supply a greater number of shape-imparting units which necessarily requires a greater number of branching and of overall increased length of the melt line. In any case it is advantageous to keep the mean residence time of the melt between the final reactor and entry into the shape-imparting unit to a maximum of 30 minutes, a preferred maximum of 15 minutes and an especially preferred maximum of 12 minutes.

To avoid the formation of temperature gradients and local decomposition of the melt, static mixers may be provided in alternating arrangements in the path of the melt which can counteract the separation of boundary layers from the core of the melt.

In order to keep the residence time between the final reactor and the shape-imparting unit as small as possible, the static mixers themselves may be made as short as possible so that their lengths are at most three time the inner diameter of the pipe segment in which they are provided.

The preform machines of today are so constructed that the machine parts into which the melt is fed are designed, for the purposes of cleaning and maintenance, to be moved say at least once daily into a maintenance position. This is not a problem when the preform machine is supplied with a polymer granulate and has a melt-forming extruder incorporated therein. With the method of the present invention, however, a high viscosity polymer melt is fed to the injection-molding machine, usually through a rigid jacketed pipe. To provide a suitable connection between the last additive injection unit and the movable machine parts, according to the invention, a flexible duct structure is provided, for example, in the form of flexible swivel joints as permanent connections between the fixed melt duct and the movable machine parts. With the flexible swivel joint system, a horizontal movement of a maximum of 100 cm, preferably a maximum of 50 cm and especially preferably a maximum of 30 cm can be compensated for the maintenance and cleaning movements. The flexible swivel joint system can have a horizontal orientation of its ducts with vertical pivot axes or a vertical orientation of ducts with horizontal pivot axes.

At the delivery point of the preform machine, a constant pressure should be maintained. To ensure a constant rate of melt feed to the machine, this pressure should be between 1 and 20 bar, preferably 10±1 bar. The pressure is set according to the invention by varying the recycling rate from the outlet of the final reactor of the surplus melt back to the esterification stage and/or the feed of excess melt to the granulating device. The pressure measurement is effected directly ahead of the preform machine. The preferred melt temperature lies between 280 and 285° C.

BRIEF DESCRIPTION OF THE DRAWING

The sole FIGURE of the drawing is a flow diagram illustrating the method and apparatus of the invention.

SPECIFIC DESCRIPTION

The prepolymer is fed from one or more precondensing reactors at 20 into a final reactor 1 which can represent one or more final reactors, for example, of the type HVSR or the double drive type and can have internal stirrers 21 driven by the motor 22. The reactor is connected to a vacuum system 23 for extracting vapors. In the reactor the polyester is highly condensed and is discharged by a discharge pump 2. Through a static 3×3D mixing element 3 to a duct system represented generally at 24 past a first additive injector 25. This first additive injector feeds a desired quantity of an additive (e.g. an acetaldehyde's reducer and optionally other substances) to the melt and is followed by a static 15D mixing element 4 of the piping system 24. This system is connected via a pressure-lifting booster pump 5 and further static-mixing elements 26 with a first distribution point 27 at which further ducts 28 split to the flow. Upstream of the booster pump 5, a pump 6 may be provided to divert a part of the stream to a granulator 7 while a further pump 29 can divert another part of the stream in a recycle 30 to the esterification stage (not shown). The pressure detected by a sensor 31 serves to control the diverting pump 7.

The main melt stream from the branch lines 28 can have static mixers 8 therein just before they meet further branch points 32. The branching lines 32, in turn, can have static mixers 33 therein before they are branched at 34 each to four branch lines 35 supplying respective preform machines 36. If required, second additive injectors 37 can be provided upstream of static mixers 38 in each of the lines 35. The connection at 40 between the static mixers 38 and the preform machines 36 can be flexible swivel joint systems as described.

SPECIFIC EXAMPLES

The invention will be described below with respect to a number of examples which are not intended to be limiting.

The intrinsic viscosity (I.V.) was measured at 25° C. in a solution of 500 mg polyester in 100 ml of a mixture of phenol and 1.2-dichlorobenzene (3:2 parts by weight).

The COOH terminal group concentration as determined by photometric titration with 0.05 m ethanolic potassium hydroxide against bromthymol blue of a solution of the polyester in a mixture of o-cresol and chloroform (70:30 parts by weight).

The measurement of the color values L and b are carried out by the method of HUNTER. The polyester chips were crystallized initially in a drying cabinet at 135±5° C. for an hour. The color values were then determined in a three region color measuring device of the color tone of the polyester sample with three photo cells having ahead of them respectively red, green and blue filters (X, Y and Z values). The calculation was carried out by the HUNTER formulas.

$$L = 10\sqrt{Y}$$

and $$b = 7.0/(\sqrt{Y(Y-0.8467Z)})$$

The acetaldehyde was driven out by heating the polyester in a closed vessel and the acetaldehyde in the head space was determined with a head space injection system H 540, Perkin Elmer gas chromatograph, carrier gas: nitrogen; column: 1.5 m stainless steel; packing: Poropack Q 80-100 mesh; sample quantity: 2 g; heating temperature: 150° C.; heating duration 90 min.

The product was weighed and heated from a starting temperature of 35° C. at a heating rate at 10 K/min to 300° C. and then the melting point and the amount of energy required for melting were determined.

The high viscosity polyethyleneterephthlate melt which was the subject of the test in the tabulated examples below, was produced in a continuous polycondensation reactor of the high viscosity self-cleaning type HVSR, as described for example in EP 0 320 586. This reactor had a horizontal shaft with specially formed heatable paddles and stators built into the reactor which fed the viscous melt adhering to the shaft and the wall surfaces back into the process. Starting from a commercial granulate for producing bottles to be filled with carbonated fruit juices with an I.V. of 0.62 dl/g, the granulate was dried, melted in a single screw extruder of the Hussmann type and continuously fed to the HVSR. There the polymer at a throughput of about 2 kg/h at a pressure of 0.1 to 0.5 mbar and a temperature of 275° C. -280° C. was condensed to a viscosity of 0.80-0.84 dl/g, an acetaldehyde value of about 30 ppm and a b color of 0.3 to 0.4. By means of a gear pump this product was fed through the static mixing elements of the type SMX of the firm Sulzer directly to the modified preform machine XL 160 with a modified mixing stretch and a two cavity die to simultaneously produce two preforms.

To satisfy the various requirements in the tests, the number of mixing elements were varied and the lengths of the mixing elements given in terms of the pipe diameter (=1D) for equalizing the temperature between the boundary layers and core of the melt, three mixing elements alternated with one another over the pipe length (3×3D) and for uniform distribution of the additive, 15D mixing elements were used after the initial additive input. A second additive injection into the melt line occurred immediately upstream of the rotary joint and the rotary joint ducting was horizontal with vertical pivot axes. A premixing of the additive utilized 3D mixing elements. The static distribution of the additive was achieved in the modified mixing stretch of the preform machine.

During the tests, the amount of melt for the preform machines was varied between 90% and 72% of the volume coming from the final reactor by matching the operating regimes of the preform machine thereto. The preform machine was continuously supplied with the melt by adjustment of the pressure upstream of the machine. The control of the pressure was effected by controlling the diversion of melt from the main stream following the first additive injection by means of a gear pump. The diverted part of the melt was processed in a granulator to chips. These chips were then dried in a crystallizer under nitrogen serving as a carrier gas, crystallized and further processed to preforms.

To determine the product quality, the granulate and the preforms were milled under a nitrogen atmosphere and subjected to laboratory testing by the described methods for evaluation of the significant quality criteria.

The metering of the additives, stabilizers and coloring agents was effected with a side stream extruder manufactured by the Hussmann firm in combination with gear pumps. Commercial additives were tested in both liquid and solid form.

The significant process parameters and qualities are given in the following Tables 1 to 3. In the tables D represents the diameter of the melt piping, L the length of the melt piping, L/D the ratio of length to diameter of the melt piping, $t_1$ the residence time in the melt piping up to the second additive system, $t_2$ the residence time of the melt between the second additive system and entry into the preform machine, p the process pressure of the melt at the end of the melt piping and T the melt temperature upon leaving the pipe joint at the inlet to the preform machine. At feed 1 or feed 2, the amount of additive and other substances at the additive injection points 1 and 2 are indicated. AAS represents the acetaldehyde scavenger as produced by the Coca-Cola® firm, P the stabilizer H-MOD of the firm Rhodia and DYE the dyestuff estofil blue of the Clariant firm.

The polyester melt has at the outlet of the HSVR the following characteristics: I.V.=0.83 dl/g, COOH content=22 mmol/kg, acetaldehyde content=32 ppm, color b=−3 units.

From tests 8 and 9 it can be seen that the increase in the melt residence time between the second additive system and the entry into the preform machine, in spite of the addition of a stabilizing compound together with the scavenger is slightly poorer than following the first additive system and has an affect on preform quality.

TABLE 1

|  | UNITS | TEST 1 | 2 | 3 | 4 | 5 | 6 | 7 |
|---|---|---|---|---|---|---|---|---|
|  | kg/h | 20 | 20 | 20 | 20 | 20 | 20 | 20 |
| RATE Preform machine | kg/h | 18 | 18 | 18 | 18 | 18 | 18 | 18 |
|  | % | 90 | 90 | 90 | 90 | 90 | 90 | 90 |
| D | mm | 20 | 20 | 20 | 20 | 20 | 20 | 20 |
| L | m | 5 | 5 | 5 | 5 | 10 | 10 | 10 |
| L/D |  | 250 | 250 | 250 | 250 | 500 | 500 | 500 |
| $t_1$ | min | 5.5 | 5.5 | 5.5 | 5.5 | 11 | 11 | 11 |
| $t_2$ | sec | 285 | 285 | 285 | 285 | 285 | 285 | 285 |
| p | bar | 20 | 20 | 20 | 20 | 20 | 20 | 20 |
| T | °C. | 282 | 282 | 282 | 282 | 284 | 284 | 284 |
| AAS-ADDITION | ppm | without | 1000 AA | 1000 AA | 1000 AA 15 P | 1000 AA 15 P | 1000 AA 15 P | without |
| AAS-ADDITION | ppm | without | without | 500 AAS | 500 AAS | 500 AAS | 500 AAS 0.5 DYE | without |
| Preform: |  |  |  |  |  |  |  |  |
| I.V. | dl/g | 0.80 | 0.79 | 0.785 | 0.795 | 0.785 | 0.78 | 0.79 |
| COOH | mmol/kg | 32 | 33 | 35 | 33 | 34 | 39 | 37 |
| AA | ppm | 53 | 6.5 | 2.5 | 2.0 | 3.0 | 6.0 | 64 |
| b color | unit | 0.8 | 2.5 | 3.0 | 0 | 0.5 | 0.2 | 5.5 |

TABLE 2

|  |  | TEST 8 | 9 | 10 | 11 | 12 | 13 |
|---|---|---|---|---|---|---|---|
|  | kg/h | 20 | 20 | 20 | 20 | 20 | 20 |
| RATE Preform machine | kg/h | 18 | 14.4 | 18 | 18 | 18 | 18 |
|  | % | 90 | 72 | 90 | 90 | 90 | 90 |
| D | mm | 20 | 20 | 25 | 25 | 25 | 25 |
| L | m | 5 | 5 | 5 | 10 | 15 | 15 |
| L/D |  | 250 | 250 | 200 | 400 | 600 | 600 |
| $t_1$ | min | 5.5 | 5.5 | 8.6 | 17.2 | 26 | 26 |
| $t_2$ | sec | 285 | 350 | 285 | 285 | 285 | 285 |
| p | bar | 20 | 20 | 20 | 20 | 20 | 20 |
| T | °C. | 282 | 282 | 283 | 284.5 | 286 | 286 |
| AAS-ADDITION | ppm | 1000 AA 15 P | 1000 AA 15 P | without | without | without | 1500 AA 25 P |
| AAS-ADDITION 2 | ppm | 500 AA | 500 AA | without | without | without | 500 AA |
| Preform: |  |  |  |  |  |  |  |
| I.V. | dl/g | 0.793 | 0.796 | 0.80 | 0.78 | 0.775 | 0.76 |
| COOH | mmol/kg | 34 | 33 | 34 | 40 | 45 | 46 |
| AA | ppm | 1.9 | 2.8 | 61 | 80 | 95 | 8.5 |
| b color | unit | 0.3 | 0.9 | 1.3 | 5.7 | 5.9 | 3.4 |

From the results of tests 1-7, it is possible to recognize clearly the effect of different residence times on decomposition of terms of the following IV, carboxyl terminal group concentration and the rise in b coloration in the preform. The additional effects of decomposition is also recognizable from the amount of the acetaldehyde scavenger required which is introduced with a stabilizing compound in the first additive system for compensation. The acetaldehyde content can be reduced below 8 ppm to a commercially acceptable concentration. To improve the color, a very small addition of blue dye is added to a concentration of 0.5 ppm.

In tests 10 to 12, further increases in residence time by increasing the nominal width of the melt-carrying piping are explored together with the associated increase in temperature of the melt. This can result in a further reduction in quality and an increase in basic acetaldehyde content (acetaldehyde value without scavenger addition). To compensate, the scavenger addition is increased at the first additive stage to 150% and the stabilizer concentration by 10 ppm in terms of phosphorous proportion. The expected reduction in quality in terms of the important quality characteristics of the polymer cannot be completely eliminated by these techniques. The acetaldehyde content in the preform can rise to 8.5 ppm.

All of the preforms produced by tests 2-6, 8-9 and 13 were used to produce bottles in a laboratory bottle-blowing machine with a blow molder of the type SIDEL LBO 01 for the production of 0.5 liters contoured bottles at standard settings. The bottles met the quality requirements of commercial bottles.

The granulate produced in the tests was crystallized in a fluid bed crystallizer of the firm Vibra for 30 minutes at temperatures between 190 and 205° under nitrogen as a carrier gas and further had their acetaldehyde content reduced. They were then dried in a conventional Challenger drier for four hours at 170° C. to an adhesion-free product which could be processed in a laboratory preform machine with a two cavity die of the firm Husky to 28 gram preforms with an acetaldehyde content between 5 and 6 ppm.

We claim:

1. A method of making molded articles of high-condensation polyester having an acetaldehyde content in a preform of high-condensation polyester of a maximum of 8 ppm, the method comprising the steps of:
   (a) producing a melt of a high-condensation polyester in a polycondensation reactor system and outputting the high-condensation polyester melt from a final stage of a high-viscosity self-cleaning or double-drive reactor;
   (b) flowing the outputted high-condensation polyester melt without any solidification or degasification from said final reactor stage to a molding unit;
   (c) adding an acetaldehyde-reducing substance or a mixture of acetaldehyde-reducing substances one or at most two times to the high-condensation polyester melt flow downstream of the final reactor stage and upstream of the molding unit; and
   (d) thereafter introducing the high-condensation polyester melt flow with the acetaldehyde-reducing substance into the molding unit and shaping said molded articles from said high-condensation polyester melt in said molding unit.

2. The method defined in claim 1 wherein 50 to 100% of the high-condensation polyester melt outputted by the final reactor stage is fed to said molding unit.

3. The method defined in claim 2, further comprising the step of
   controlling a melt-feed pressure in said molding unit by controlledly diverting a portion of the high-condensation polyester melt outputted by the final reactor stage away from said molding unit.

4. The method defined in claim 3 wherein the melt-feed pressure in said molding unit is controlled to a pressure between 1 and 20 bar by controlling the amount of the high-condensation polyester melt diverted from said molding unit.

5. The method defined in claim 4 wherein said pressure is controlled to 10±1 bar.

6. The method defined in claim 5 wherein the high-condensation polyester melt diverted from said molding unit is selectively recycled to an esterification stage and to a granulation stage.

7. The method defined in claim 6 wherein 0 to 50% of the high-condensation polyester melt diverted from said molding unit is selectively recycled to the esterification stage and to the granulation stage.

8. The method defined in claim 7 wherein a maximum of 20% of the high-condensation polyester melt outputted by the final reactor stage is recycled to the esterification stage.

9. The method defined in claim 8 wherein a maximum of 10% of the high-condensation polyester melt outputted by the final reactor stage is recycled to the esterification stage.

10. The method defined in claim 1 wherein said final reactor stage comprises at least two end reactors in parallel supplying the high-condensation polyester melt to different molding units.

11. The method defined in claim 1 wherein said final reactor stage comprises at least one end reactor supplying the high-condensation polyester melt to at least two molding units.

12. The method defined in claim 1, further comprising providing a pressure increasing pump upstream of a first distribution of the high-condensation polyester melt to different paths.

13. The method defined in claim 1 wherein a main stream of the high-condensation polyester melt from said final reactor stage is fed to an even number of molding units.

14. The method defined in claim 1 the acetaldehyde-reducing substance or mixture of substances is added to the flow in solid form or as a slurry.

15. The method defined in claim 14 wherein said acetaldehyde-reducing substance or mixture of substances is added to the flow of high-condensation polyester melt subsequent to an increase in a pressure thereof.

16. The method defined in claim 15 wherein said acetaldehyde-reducing substance or mixture of substances is added to the high condensation polyester melt downstream of a last distribution of said melt into a plurality of melt streams and upstream of a respective molding unit which receives a respective melt stream from the plurality of melt streams.

17. The method defined in claim 16 wherein a different acetaldehyde-reducing substance or mixture of substances is added to the high-condensation polyester melt upstream of each respective molding unit.

18. The method defined in claim 14 wherein a mean residence time of the melt from addition of said substance or mixture of substances to entry into a molding unit is a maximum of 6 minutes.

19. The method defined in claim 18 wherein said mean residence time is a maximum of 2 minutes.

20. The method defined in claim 14 wherein after said acetaldehyde-reducing substance or mixture of substances is added to the flow of high-condensation polyester melt the resulting mixture is passed through a static mixing element with a minimum length of 3 times its diameter.

21. The method defined in claim 20, further comprising the step of adding the acetaldehyde-reducing substance or mixture of substances to the flow of the high-condensation polyester melt in a second addition directly upstream of a movable generally horizontal flexible swivel joint with vertical pivot axes at a static mixing element with a minimum length of 3 times its diameter.

22. The method defined in claim 14 wherein said acetaldehyde-reducing substance or mixture of substances includes a phosphorus-containing substance.

23. The method defined in claim 1 wherein a mean residence time of the melt between the final reactor stage and the molding unit is maintained at a maximum of 12 minutes, and the path of the melt between the final reactor stage and the molding unit is configured for a maximum pressure of 200 bar and operation at a temperature range of 280° to 285° C.

24. A method of making molded articles of high-condensation polyester, the method comprising the steps of:
   (a) producing a melt of a high-condensation polyester in a polycondensation reactor system and outputting the high-condensation polyester melt from a final reactor stage of a high-viscosity self-cleaning or double-drive reactor;

(b) forming a main flow of 50 to 100% of the high-condensation polyester melt outputted by the final reactor stage;
(c) diverting 0 to 50% of the high-condensation polyester melt outputted by the final reactor stage selectively to an esterification stage or to a granulation stage to control a pressure of the;
(d) subdividing said main flow at least once into an even number of substreams and feeding same to respective molding units;
(e) adding to each substream of the high-condensation polyester melt before it enters the respective molding unit and after a last subdivision an acetaldehyde-reducing substance or mixture of acetaldehyde-reducing substances in solid form or as a slurry including an acetaldehyde-reducing substance; and
(f) preventing any solidification or degasification of the high-condensation polyester melt in the main flow and subflows between said final reactor stage to each molding unit.

\* \* \* \* \*